United States Patent [19]

Kmiec et al.

[11] Patent Number: 4,588,752

[45] Date of Patent: May 13, 1986

[54] FOAMING AND VULCANIZING OF ELASTOMERIC POLYMERS

[75] Inventors: Chester J. Kmiec, Amherst; Michael F. Novits, Buffalo, both of N.Y.

[73] Assignee: Pennwalt Corporation, Philadelphia, Pa.

[21] Appl. No.: 781,833

[22] Filed: Sep. 30, 1985

[51] Int. Cl.⁴ .............................................. C08J 9/10
[52] U.S. Cl. ......................................... 521/82; 521/89; 521/91; 521/92; 521/95; 521/138; 521/140; 521/144; 521/148; 521/150
[58] Field of Search ..................... 521/82, 91, 92, 95, 521/138, 140, 144, 148, 150, 89

[56] References Cited

U.S. PATENT DOCUMENTS

| | | | |
|---|---|---|---|
| 3,580,867 | 5/1971 | Spenadel | 521/150 |
| 4,307,204 | 12/1981 | Vidal | 521/95 |
| 4,322,502 | 3/1982 | Stott | 521/138 |
| 4,393,148 | 7/1983 | Kamens | 521/96 |
| 4,397,965 | 8/1983 | Stott | 521/138 |
| 4,435,525 | 3/1984 | Kamens | 521/92 |

Primary Examiner—Morton Foelak

[57] ABSTRACT

Closed-cell crosslinked sponges of varying densities are prepared from an admixture of a vulcanizable elastomer, vulcanizing ingredients selected from sulfur or sulfur donor compounds together with metal oxides and/or sulfur vulcanization accelerators and a t-alkyl-hydrazinium salt and/or carbonylhydrazine. The crosslinked sponges have uniform cellular structures and are easily prepared with the desired density.

9 Claims, No Drawings

FOAMING AND VULCANIZING OF ELASTOMERIC POLYMERS

This invention is related to the foaming and vulcanizing of elastomeric polymers using sulfur vulcanization systems and a t-alkylhydrazinium salt or carbonylhydrazine.

It is well known in the art that vulcanized elastomeric sponges can be prepared by heating a composition that contains a vulcanizable elastomeric polymer, vulcanizing agents, and a chemical blowing agent. Generally closed-cell elastomeric sponges are produced by three typical processes; low pressure molding, high pressure molding, and continuous extrusion (i.e., free blow). The use of chemical blowing agents such as azo compounds, N-nitroso compounds, and sulfonyl hydrazides are well known in the art in the above processes.

These compounds generate the gases needed for expansion by thermally decomposing. Therefore, since the vulcanization system is also governed thermally, there is a critical need to carefully balance this system with the decomposition of the blowing agents, in order to produce quality sponge products. U.S. Pat. No. 3,580,867, column 4, line 44–50, indicates the need of maintaining a proper balance between the cure rate and decomposition of the blowing agent.

The need to balance the cure rate to the blowing rate is a disadvantage of the prior art. If the elastomer is significantly cured prior to gas generation, generally a product with little expansion is obtained. Alternatively, if a significant amount of gas generation occurs prior to vulcanization, collapsing of the sponge structure will occur.

U.S. Pat. No. 4,307,204 discloses a sponge composition where the use of 5–15% of an ionomer resin (an ethylene polymer containing at least about 50 mole percent ethylene and bearing from about 0.2–25 mole percent acid functional groups that are preferably 85–100% neutralized by metal ions) as a method of overcoming the need for critical balancing of the cure rate and blowing rate.

U.S. Pat. Nos. 4,393,148 and 4,435,525 disclose the use of t-alkylhydrazinium salts and carbonylhydrazines as blowing agents in combination with transitional metal salts and organic peroxides to foam unsaturated polyester resins at room temperature.

None of the above mentioned prior art discloses the present invention.

SUMMARY OF THE INVENTION

The present invention is directed to a foamable and vulcanizable composition comprising an admixture of a vulcanizable elastomeric polymer and a gas generating composition of a t-alkylhydrazinium salt or a carbonylhydrazine and sulfur and/or a sulfur donor compound together with metal oxides and/or sulfur vulcanization accelerators.

This invention also comprehends a process of foaming and vulcanizing the above mentioned composition to produce closed-celled vulcanized sponges of varying densities, which process eliminates the need to carefully balance the cure rate and the rate of gas generation in order to produce a high quality vulcanized sponge.

DETAILED DESCRIPTION OF THE INVENTION

It has now been found that gas needed for expansion of an elastomeric polymer is obtained from a reaction between the t-alkylhydrazinium salt and/or carbonylhydrazine of the present invention and the sulfur vulcanization system, thus eliminating the need for balancing of the cure to the expansion. The sponge producing process is, therefore, governed by the vulcanizing system. Hence, the present invention can be used with both low and high temperature vulcanizing systems to produce sponges of varying densities.

Polymerizable Medium

The polymerizable media encompassed in the present invention are defined as natural or synthetic materials which are elastomeric in nature and which are capable of being vulcanized. Elastomers can be defined as materials whose glass transition temperature is below ambient temperature, and which at room temperature can be stretched repeatedly to twice its original length, whereupon its release, returns approximately to its original length. Vulcanization can be defined as a process by which, usually through the incorporation of chemical vulcanizing agents (i.e., vulcanization systems), the physical properties of the material are changed through crosslinks between the polymer chain molecules. For the process of the present invention these vulcanizable polymers include elastomers such as natural rubber, ethylene-propylene terpolymers, styrene-butadiene rubbers, polybutadiene, butyl rubber, chlorinated butyl rubber, brominated butyl rubber, synthetic polyisoprene, nitrile rubber, polyacrylate rubbers, neoprene, chlorosulfonated polyethylene, polysulfide rubbers, and chlorinated polyethylene.

In addition, blends of two or more of these elastomeric materials can be used in this invention.

t-Alkylhydrazinium Salts and Carbonylhydrazine

The hydrazine derived compounds which are useful in the process of this invention are t-alkylhydrazinium salts having the following general structure:

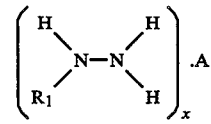

where x is an integer of 1, 2, 3 or 4 and A is an inorganic or organic acid; when x is 1, A is a monoprotic acid; when x is 2, A is a diprotic acid; when x is 3, A is a triprotic acid; and when x is 4, A is terprotic acid; $R_1$ is a tertiary hydrocarbon radical of 4 to 8 carbons. Examples of t-alkylhydrazinium salts include di-t-butylhydrazinium sulfate, t-butylhydrazinium bisulfate, t-butylhydrazinium chloride, mono-t-butylhydrazinium phosphate, t-butylhydrazinium benzoate, t-butylhydrazinium acetate, di-t-butylhydrazinium succinate, t-butylhydrazinium di-(2-ethylhexyl)phosphate, mono-t-butylhydrazinium oxalate, di-t-butylhydrazinium oxalate, t-butylhydrazinium neodecanoate, di-t-butylhydrazinium azelate, t-butylhydrazinium pivalate, t-butylhydrazinium p-toluenesulfonate, t-butylhydrazinium methanesulfonate, t-butylhydrazinium sulfonate, tetra-t-butylhydrazinium 1,2,4,5 benzenetetracarboxylate, di-t- butylhydrazinium terephthalate, mono t-butylhydrazinium dipicolinate, di-t-butylhydrazinium carbonate, t-butylhydrazinium sodium sulfate, t-butylhydrazinium malate, t-butylhydrazinium tributyl sulfate, t-amylhydrazinium chloride, and di(t-butylhydrazinium)isophthalate.

Two of the most preferred compounds are t-butylhydrazinium chloride (t-BZ.HCL) and di-t-butylhydrazinium sulfate [(t-BZ)₂.H₂SO₄].

Carbonylhydrazines useful in this invention have the following general structure:

where X is selected from R₂O—, R₃,

and H₂NNH—; R₂ can be alkyl of 1 to 20 carbons, cycloalkyl of 5 to 12 carbons, aralkyl of 7 to 18 carbons, aryl of 6 to 18 carbons, alkenyl of 2 to 20 carbons, alkynyl of 2 to 20 carbons, or a 5 or 6 membered heterocyclic containing a nitrogen, sulfur, or oxygen atom in the ring; R₃ can be independently defined as R₂ or hydrogen; R₄ can be a covalent bond or a diradical selected from alkylene of 1 to 16 carbons, alkenylene of 2 to 16 carbons, alkynylene of 2 to 16 carbons, cycloalkylene of 5 to 16 carbons, arylene of 6 to 18 carbons, or aralkylene of 7 to 18 carbons; each of R₂, R₃, and R₄ can be branched or unbranched and optionally substituted with lower alkoxy, nitro, halogen, cyano, carboxy, hydroxy, lower acyloxy, aroloxy, sulfo, lower alkoxycarbonyl, lower alkoxycarbonyloxy, N-substituted or un-substituted carbamoyl and carbamoyloxy, lower thioalkoxy, lower thioacyloxy, lower dithioacyloxy, lower thioalkoxycarbonyl, lower dithioalkoxycarbonyl, lower thioalkoxycarbonyloxy, lower acyl, aroyl, and lower alkylsulfonato where lower alkyl includes 1 to 6 carbons; and R₄ can contain connective groups in the diradical backbone selected from the group consisting of

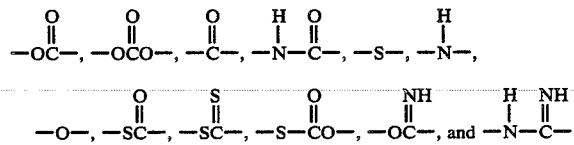

Examples of carbonylhydrazine compounds of this invention include the following:

(1) Acid hydrazides such as formic, acetic, propionic, hexanoic, oleic, lauric, stearic, benzoic, toluic, furoic, eicosanoic, phenylacetic, cinnamic, mandelic, dihydrocinnamic, acetylsalicylic, anthranilic, nitrobenzoic, chlorobenzoic, sulfobenzoic, thenoic, naphthoic, nicotinic, and crotonic hydrazide;

(2) Dibasic acid dihydrazides such as oxalic, malonic, succinic, glutaric, adipic, pimelic, suberic, azelaic, sebacic, maleic, fumaric, citraconic, phthalic, isophthalic, terephthalic and tartaric dihydrazide;

(3) Carbazates such as methyl, ethyl, propyl, isopropyl, t-butyl, sec.-butyl, isobutyl, n-butyl, hexyl, octyl, decyl, hexadecyl, octadecyl, benzyl, phenethyl, octenyl, allyl, cyclohexyl, cyclopentyl, phenyl naphthyl, thenyl, furyl, and propynyl carbazate; and (4) Carbohydrazide.

The preferred compounds are 2-furoic acid hydrazide, adipic acid dihydrazide, carbohydrazide, t-butyl carbazate, acetylhydrazide, toluic acid hydrazide, succinic acid hydrazide, and ethyl carbazate.

For elastomeric polymers preblending the t-alkylhydrazinium salts and/or carbonylhydrazines with plasticizers or processing oils can be, but not necessarily has to be done to facilitate mixing into the polymer. Generally the amount of the compound can be varied over a relatively wide range to achieve desired foam densities; however, they are typically used in amounts ranging from 0.1 to 20 phr and preferably from 0.2 to 10 phr.

Generally, the particle size of the t-alkylhydrazinium salts and/or carbonylhydrazine can be varied over a wide range to achieve the desired cellular product. A particle size range of 1 micron to 100 microns and preferably from 2.0 microns to 75 microns is desired. They can also be incorporated as masterbatches in suitable carriers.

Vulcanization Systems

The vulcanization system encompassed within the present invention can include any of those non-peroxidic systems that are conventionally employed in rubber vulcanization. These can include systems such as sulfur vulcanization and accelerated sulfur vulcanization systems, as described in *Science and Technology of Rubber*, edited by F. R. Eirich, chapter 7, pages 295-314, 1978; vulcanization by phenolic resins, quinone derivatives or maleimides as described in *Science and Technology of Rubber*, 1978, edited by F. R. Eirich, chapter 7, pages 315-322; metal oxide vulcanization, as described in *Science and Technology of Rubber*, 1978, edited by F. R. Eirich, chapter 7, pages 322-324; and aminethiadiazole vulcanization systems as described in U.S. Pat. No. 4,128,510.

Accelerated sulfur vulcanizations are the most widely used. These systems conventionally employ sulfur and/or sulfur donor compounds and various accelerator combinations selected from the group of aldehyde amines, guanidines, thiazoles, sulfenamides, thiurams, dithiocarbamates and metal oxides. Illustrative examples of accelerators and sulfur donor compounds include benzothiazyl disulfide, 2-mercaptobenzothiazole, zinc 2-mercaptobenzothiazole, copper 2-mercaptobenzothiazole, zinc dimethyldithiocarbamate, copper dimethyldithiocarbamate, lead diamyldithiocarbamate, lead dimethyldithiocarbamate, zinc diethyldithiocarbamate, zinc diamyldithiocarbamate, bismuth dimethyldithiocarbamate, cadmium diamyldithiocarbamate, cadmium diethyldithiocarbamate, selenium diethyldithiocarbamate, selenium dimethyldithiocarbamate, tellurium diethyldithiocarbamate, tetraethylthiuram disulfide, tetrabutylthiuram disulfide, tetramethylthiuram disulfide, tetramethylthiuram monosulfide, trimethylthiourea, 1,3-diethylthiourea, 1,3-dibutylthiourea, 4-morpholinyl-2-benzothiazole disulfide and N-tert-butyl-2-benzothiazolesulfenamide. Illustrative examples of metal oxides include zinc oxide, lead oxide (PbO), red lead (Pb₃O₄) and magnesium oxide. Factors such as activity, scorch tendencies, aging properties, curing temperature/time, etc., influence the selection of the proper accelerators, hence, the vulcanization system.

Sulfur and/or sulfur donor compounds can be used at levels ranging from 0.25 phr to 10 phr, more preferably 0.5 phr to 5 phr. Accelerators and combinations thereof can be used at levels ranging from 0.05 phr to 10 phr, more preferably 0.1 to 5 phr.

ADDITIVES TO MEDIUM

The gas generating compositions of the present invention may also be used in combination with current commercial blowing agents, such as azodicarbonamide, p-toluenesulfonylhydrazide, 4,4-oxybis(benzenesulfonylhydrazide), dinitrosopentamethylenetetramine, and 5-phenyltetrazole.

The composition of the present invention may include fillers, antioxidants, stabilizers, plasticizers, processing oils, and processing aids.

PROCESS CONDITIONS

The sponge composition of this invention is generally heat cured to a time sufficient to obtain the desired level of vulcanization and expansion.

The heating of the composition of the present invention has a time-temperature relation which is primarily dependent on the specific polymer material and specific vulcanization system employed. Generally, vulcanizing temperatures are within the range of 50° C. to 350° C., more preferably 75° C. to 250° C. The time necessary for vulcanization and/or expansion can vary within the general range of 30 seconds to 2 hours, more preferably 1 minute to 90 minutes.

When one of these compositions for producing cellular bodies is heated to effectuate vulcanization/expansion, it will be appreciated that the fluidity and related characteristics of the composition must be such as to accommodate the gas evolved while retaining the cellular structure. In the practice of this invention open or closed molds may be used in conjunction with known processing methods such as low pressure molding, high pressure molding, or continuous extrusion.

EXAMPLES

Standard Experimental Procedure

Compounding

All formulations were compounded using the C. W. Brabender Plastograph mixer with roller-5 type mixing blades. The mixer was at ambient temperature (no preheating) unless otherwise specified in the specific example. The components which consisted of fillers, such as carbon black, calcium carbonate, etc., as well as the oil/plasticizers were weighed at the desired parts by weight of elastomer, specified in the specific example, into a 9-ounce waxed paper cup and mixed using a small metal spatula. The gas-generating composition of the vulcanization system and t-alkylhydrazinium salt and/or carbonylhydrazine was then weighed at the desired parts by weight of elastomer specified in the specific example, into a 3-ounce waxed paper cup and mixed using a small metal spatula.

100 Parts by weight of the elastomer were fluxed in the C. W. Brabender Plastograph at the mixing speed designated in the appropriate example. The content of the cups was then slowly added to the fluxing elastomer. The composition was allowed to mix for five (5) minutes. The entire composition was then removed from the mixer and subsequently pressed into flat plaque (no specific thickness) using a room temperature Carver Laboratory Press (Model C). The flat sheet was then allowed to cool to room temperature.

Vulcanization/Expansion Procedure

The specific cure temperature and cure time for each composition are detailed in the appropriate example; otherwise, the following procedure was used to produce a vulcanized elastomeric sponge.

A Carver Laboratory Press (Model C) and a circulating air oven were preheated to the desired temperature along with a 3.375"×3.375"×0.09" mold. Enough of the specific compounded composition was used to completely fill the mold cavity. The mold was inserted into the press and low pressure was applied for the specific Monsanto Oscillating Disk Rheometer $Ts_2$ value listed in the appropriate example, after which pressure was then released and the mold removed. The sample was then immediately removed from the mold and transferred to the oven for final curing and expansion.

Monsanto Oscillating Disk Rheometer Procedure

The Monsanto Oscillating Disk Rheometer was used to obtain a $Ts_2$ time value. This value was used in the foaming procedure as the length of time for which low pressure was applied to the sample in the press. By utilization of the $Ts_2$ value, various vulcanization systems were compensated for whereby when the samples were placed in the oven for final cure and expansion, all were crosslinked to approximately the same order of magnitude at this point in the foaming procedure.

The Monsanto Rheometer test procedure consists of an uncured sample enclosed under positive pressure in a heated die cavity containing a biconical disk. The disk is oscillated (100 cycles/minute) through an arc of 3°. The force or torque required to oscillate the disk is recorded as a function of time. This shear modulus is proportional to the extent of crosslinking and is a representation of the cure reaction.

Samples of the compounded compositions were run at the cure temperature detailed in the appropriate example and the test value $Ts_2$ was recorded in minutes. The $Ts_2$ time is defined as the time required for torque to increase two inch-pounds above the minimum torque.

EXAMPLE 1

This example illustrates the use of t-butylhydrazinium chloride in combination with a sulfur and sulfur vulcanization accelerators to produce a vulcanized EPDM sponge (Table I). The mixing speed was 30 rpm. The standard mixing and sponge producing procedures were followed. Cure temperature was 149° C.

TABLE I

| Composition | Parts by weight | |
|---|---|---|
| | A | B |
| Polysar ® 585 EPDM[2] | 100 | 100 |
| N-330[3] | 40 | 40 |
| Atomite 319[4] | 40 | 40 |
| Sunpar 2280[5] | 40 | 40 |
| ZnO | 3.0 | 3.0 |
| Sulfur | 2.0 | 2.0 |
| Zinc Stearate | 1.0 | 1.0 |
| Altax[6] | 1.0 | 1.0 |
| Methyl Zimate[7] | 1.0 | 1.0 |
| Cumate[8] | 0.5 | 0.5 |
| t-butylhydrazinium chloride | — | 3.0 |
| Density | 71.5 | 22.6 |
| $Ts_2$* (minutes) | 2.6 | 1.4 |

TABLE I-continued

| Composition | Parts by weight | |
|---|---|---|
| | A | B |
| Cure Time, oven (minutes) | 28 | 8.1 |

*Time in press during foaming procedure
[2]Ethylene-propylene-diene rubber with a specific gravity of 0.86 and a Mooney viscosity (ML 1 + 8 (100° C.)) of 49-61 from Polysar Incorporated.
[3]HAF carbon black from Ashland Chemical Co.
[4]Calcium carbonate from Thompson, Weinman & Co.
[5]Paraffinic oil from Sun Refining and Marketing Co.
[6]Benzothiazyl disulfide from R. T. Vanderbilt Co., Inc.
[7]Zinc dimethyldithiocarbamate from R. T. Vanderbilt Co., Inc.
[8]Copper dimethyldithiocarbamate from R. T. Vanderbilt Co., Inc.

Column B indicates the significant density reduction obtained with the composition of the present invention. Upon visual inspection the sponge had a fine uniform cellular structure.

For the sake of comparison, the following tests illustrate that t-butylhydrazinium chloride by itself did not foam as shown in Table IA. This example uses an EDPM based composition. The mixing speed and cure time were 30 rpm and 15 minutes respectively. The standard mixing and sponge producing procedures[1] were followed. Cure temperature was 149° C.

TABLE IA

| Composition | Parts by Weight | |
|---|---|---|
| Polysar 346 EPDM[2] | 100 | 100 |
| N-539[3] | 40 | 40 |
| Atomite 319[4] | 40 | 40 |
| Sunpar 2280[5] | 30 | 30 |
| t-butylhydrazinium chloride (55% in Santicizer 711) | — | 1.82 |
| Density (lbs/ft$^3$) | 54.5 | 57.0 |

[1]Low pressure was applied on the sample in the press for 30 seconds.
[2]An ethylene-propylene-diene rubber with a specific gravity of 0.86 and a Mooney Viscosity (ML + 8 (100° C.)) of 27-30 from Polysar Incorporated.
[3]FEF-LS carbon black from Cabot Corporation
[4]Calcium carbonate from Thompson, Weinman & Co.
[5]Paraffinic oil from Sun Refining and Marketing Co.

EXAMPLE 2

This example illustrates different compositions of the present invention at various curing temperatures (Table II). This example uses an EPDM based composition. The mixing speed was 30 rpm. The standard mixing and sponge procedures were followed.

TABLE II

| Compositions | Parts by Weight | | |
|---|---|---|---|
| | A | B | C |
| Polysar 585 EPDM | 100 | 100 | 100 |
| N-660* | 40 | 40 | 40 |
| Atomite 319 | 40 | 40 | 40 |
| Sunpar 2280 | 40 | 40 | 40 |
| Zinc Oxide | 5.0 | 3.0 | 2.0 |
| Sulfur | 3.0 | 2.0 | 2.0 |
| Zinc Stearate | 1.5 | 1.0 | 0.8 |
| Altax | 1.5 | 1.0 | 1.0 |
| Amyl Zimate** | 1.5 | 1.0 | 0.8 |
| Cumate | 1.5 | 1.0 | 0.2 |
| t-butylhydrazinium chloride | 4.0 | 3.0 | 2.0 |
| Density (lbs/ft$^3$) | 25.5 | 20.0 | 29.0 |
| Cure Temperature (°C.) | 116 | 149 | 182 |
| Cure Time, Oven (minutes) | 80 | 20 | 10 |
| Ts$_2$ (minutes) | 2.9 | 1.3 | 0.7 |

*GPF carbon black from Ashland Chemical Co.
**Zinc diamyldithiocarbamate (50% in oil) from R. T. Vanderbilt Co., Inc.

EXAMPLE 3

This example illustrates a composition of the present invention as compared to prior art blowing agents in producing a vulcanized EPDM sponge (Table III). The mixing speed was 30 rpm. The standard mixing and sponge producing procedures were followed.

TABLE III

| Compositions | Parts by Weight | | |
|---|---|---|---|
| | A | B | C |
| Polysar 585 EPDM | 100 | 100 | 100 |
| N-330 | 40 | 40 | 40 |
| Atomite 319 | 40 | 40 | 40 |
| Sunpar 2280 | 40 | 40 | 40 |
| Zinc Oxide | 3.0 | 3.0 | 3.0 |
| Sulfur | 2.0 | 2.0 | 1.0 |
| Zinc Stearate | 1.0 | 1.0 | 1.0 |
| Altax | 1.0 | 1.0 | 1.0 |
| Methyl Zimate | 1.0 | 1.0 | 0.5 |
| Cumate | 0.5 | 0.5 | 0.2 |
| t-butylhydrazinium chloride | 3.0 | — | — |
| p-toluene sulfonylhydrazide | — | 3.0 | — |
| Azodicarbonamide | — | — | 3.0 |
| Density (lbs/ft$^3$) | 28.0 | 30.2 | 34.0 |
| Cure Temperature (°C.) | 144 | 149 | 193 |
| Cure Time, Oven (minutes) | 18 | 41 | 5 |
| Ts$_2$ (minutes) | 1.2 | 1.2 | 0.5 |

With the composition of the present invention (column A) a lower sponge density was obtained at lower temperatures.

EXAMPLE 4

This example illustrates the composition of the present invention containing an auxiliary chemical blowing agent, p-toluenesulfonylhydrazide, to produce a vulcanized EPDM sponge (Table IV). The mixing speed was 30 rpm. The standard mixing and sponge producing procedures were followed.

TABLE IV

| Composition | Parts by Weight |
|---|---|
| Polysar 585 EPDM | 100 |
| N-330 | 40 |
| Atomite | 40 |
| Sunpar 2280 | 40 |
| ZnO | 3.0 |
| Sulfur | 2.0 |
| Zinc Stearate | 1.0 |
| Altax | 1.0 |
| Methyl Zimate | 1.0 |
| Cumate | 0.5 |
| t-butylhydrazinium chloride | 1.5 |
| p-toluenesulfonylhydrazide | 1.5 |
| Density (lbs./ft$^3$) | 21.0 |
| Cure Temperature (°C.) | 149 |
| Cure Time, oven (minutes) | 37 |
| Ts$_2$ (minutes) | 1.2 |

EXAMPLE 5

This example demonstrates the usefulness of various t-alkylhydrazinium salts and/or carbonylhydrazines in compositions of the present invention to produce (Table V) a vulcanized EPDM sponge. The mixing speed was 30 rpm. The standard mixing and sponge producing procedures were followed.

| Compositions | Parts by Weight | | | | | | |
|---|---|---|---|---|---|---|---|
| | A | B | C | D | E | F | G |
| Polysar 585 EPDM | 100 | 100 | 100 | 100 | 100 | 100 | 100 |
| N-330 | 40 | 40 | 40 | 40 | 40 | 40 | 40 |
| Atomite 319 | 40 | 40 | 40 | 40 | 40 | 40 | 40 |
| Sunpar 2280 | 40 | 40 | 40 | 40 | 40 | 40 | 40 |
| ZnO | 3.0 | 3.0 | 3.0 | 3.0 | 3.0 | 3.0 | 3.0 |
| Sulfur | 2.0 | 2.0 | 2.0 | 2.0 | 2.0 | 2.0 | 2.0 |
| Zinc Stearate | 1.0 | 1.0 | 1.0 | 1.0 | 1.0 | 1.0 | 1.0 |
| Altax | 1.0 | 1.0 | 1.0 | 1.0 | 1.0 | 1.0 | 1.0 |
| Methyl Zimate | 1.0 | 1.0 | 1.0 | 1.0 | 1.0 | 1.0 | 1.0 |
| Cumate | 0.5 | 0.5 | 0.5 | 0.5 | 0.5 | 0.5 | 0.5 |
| Carbohydrazide | 3.0 | — | — | — | — | — | — |
| Acetylhydrazide | — | 3.0 | — | — | — | — | — |
| di(2-t-butyl hydrazinium)isophthalate) | — | — | 3.0 | — | — | — | — |
| di(t-butylhydrazinium)sulfate | — | — | — | 3.0 | — | — | — |
| di(2-t-butylhydrazinium)terephalate | — | — | — | — | 3.0 | — | — |
| t-amyl hydrazinium chloride | — | — | — | — | — | 3.0 | — |
| Succinic acid dihydrazide | — | — | — | — | — | — | 3.0 |
| Density (lbs./ft$^3$) | 45 | 31 | 28 | 35 | 44 | 25 | 45 |
| Cure Temperature (°C.) | 149 | 149 | 149 | 149 | 149 | 149 | 149 |
| Cure Time, oven (minutes) | 32 | 16.6 | 29.8 | 20.2 | 31.7 | 26.0 | 22.9 |
| $T_{S2}$ (minutes) | 1.1 | 1.2 | 1.0 | 0.9 | 2.2 | 1.2 | 1.5 |

What is claimed:

1. A foamable and vulcanizable composition comprising an admixture of a vulcanizable elastomeric polymer and a gas-generating system consisting essentially of a t-alkylhydrazinium salt and/or carbonylhydrazine and sulfur and/or sulfur donor compounds, and at least one sulfur accelerator.

2. The composition of claim 1 wherein the t-alkylhydrazinium salt and/or carbonylhydrazine is selected from t-butylhydrazinium chloride, di(t-butylhydrazinium)sulfate, carbohydrazide, acetylhydrazide, di(t-butylhydrazinium)isophthalate, di(t-butylhydrazinium)terephthalate, t-amylhydrazinium chloride and succinic acid dihydrazide.

3. The composition of claim 2 wherein the sulfur donor compounds are selected from the group of benzothiazyl disulfide, 2-mercaptobenzothiazole, zinc 2-mercaptobenzothiazole, copper 2-mercaptobenzothiazole, zinc dimethyldithiocarbamate, copper dimethyldithiocarbamate, lead diamyldithiocarbamate, lead dimethyldithiocarbamate, zinc diethyldithiocarbamate, zinc diamyldithiocarbamate, bismuth dimethyldithiocarbamate, cadmium diamyldithiocarbamate, cadmium diethyldithiocarbamate, selenium diethyldithiocarbamate, selenium dimethyldithiocarbamate, tellurium diethyldithiocarbamate, tetraethylthiuram disulfide, ethylene thiourea, tetrabutylthiuram disulfide, tetramethylthiuram disulfide, tetramethylthiuram monosulfide, trimethylthiourea, 1,3-diethylthiourea, 1,3-dibutylthiourea, 4-morpholinyl-2-benzothiazole disulfide, N-tert-butyl-2-benzothiazolesulfenamide, and 2,5-dimercapto-1,3,4-thiadiazole monobenzoate.

4. The composition of claim 3 wherein sulfur is used and the sulfur accelerators are selected from the group of sulfur donor compounds, aldehyde amines, guanidines, and metal oxides.

5. The composition of claim 4 wherein the metal oxide is selected from ZnO, PbO, $Pb_3O_4$, and MgO.

6. The composition of claim 1 wherein the vulcanizable elastomeric polymer is ethylene-propylene-diene rubber.

7. The composition of claim 1 wherein at least one filler, antioxidant, stabilizer, plasticizer, processing oil, or processing aid is present.

8. The composition of claim 7 wherein the filler is selected from carbon black, calcium carbonate, and silica powder.

9. A process of foaming and vulcanizing the composition of claim 1 comprising heating said composition at a temperature in the range of 50° C. to 350° C. for a time sufficient to produce a vulcanized sponge.

* * * * *